United States Patent [19]

Ticknor

[11] 4,143,612
[45] Mar. 13, 1979

[54] HEAVY DUTY FENDER

[75] Inventor: William C. Ticknor, Whittier, Calif.

[73] Assignee: The Johnson Rubber Company, Middlefield, Ohio

[21] Appl. No.: 787,313

[22] Filed: Apr. 14, 1977

[51] Int. Cl.² .......................... F16F 7/12; B63B 59/02
[52] U.S. Cl. ...................................... 114/219; 267/140
[58] Field of Search .......................... 267/140, 141, 62; 114/219, 220; 293/60, 49, 70, 71 R, 71 P

[56] References Cited

U.S. PATENT DOCUMENTS

| | | | |
|---|---|---|---|
| 1,781,403 | 11/1930 | Lyons | 114/220 |
| 3,107,642 | 10/1963 | Lakin | 114/219 |
| 3,447,794 | 6/1969 | Sudyk | 114/219 |
| 3,455,269 | 7/1969 | Dean | 114/219 |
| 3,873,076 | 3/1975 | Evans | 114/219 |

Primary Examiner—Trygve M. Blix
Assistant Examiner—D. W. Keen

Attorney, Agent, or Firm—McNenny, Pearne, Gordon, Gail, Dickinson & Schiller

[57] ABSTRACT

A heavy duty fender structure is disclosed which is particularly adapted for marine use. The fender includes an extruded elastomeric core having a chain extending along its axis and providing free end portions at the ends of the core for mounting the fender. A plurality of molded elastomeric discs are positioned around the core and provide the exterior surface of the fender. The discs are formed with an outer layer of elastomeric material selected for wear and non-marking properties. The inner portion of the disc is formed of elastomeric material selected for its cushioning characteristics. In some illustrated embodiments the inner portions of the discs are formed with openings of various shapes selected and arranged to provide the desired cushioning characteristics of the assembled fender. Rods extend through the discs to secure the discs together around the core.

15 Claims, 7 Drawing Figures

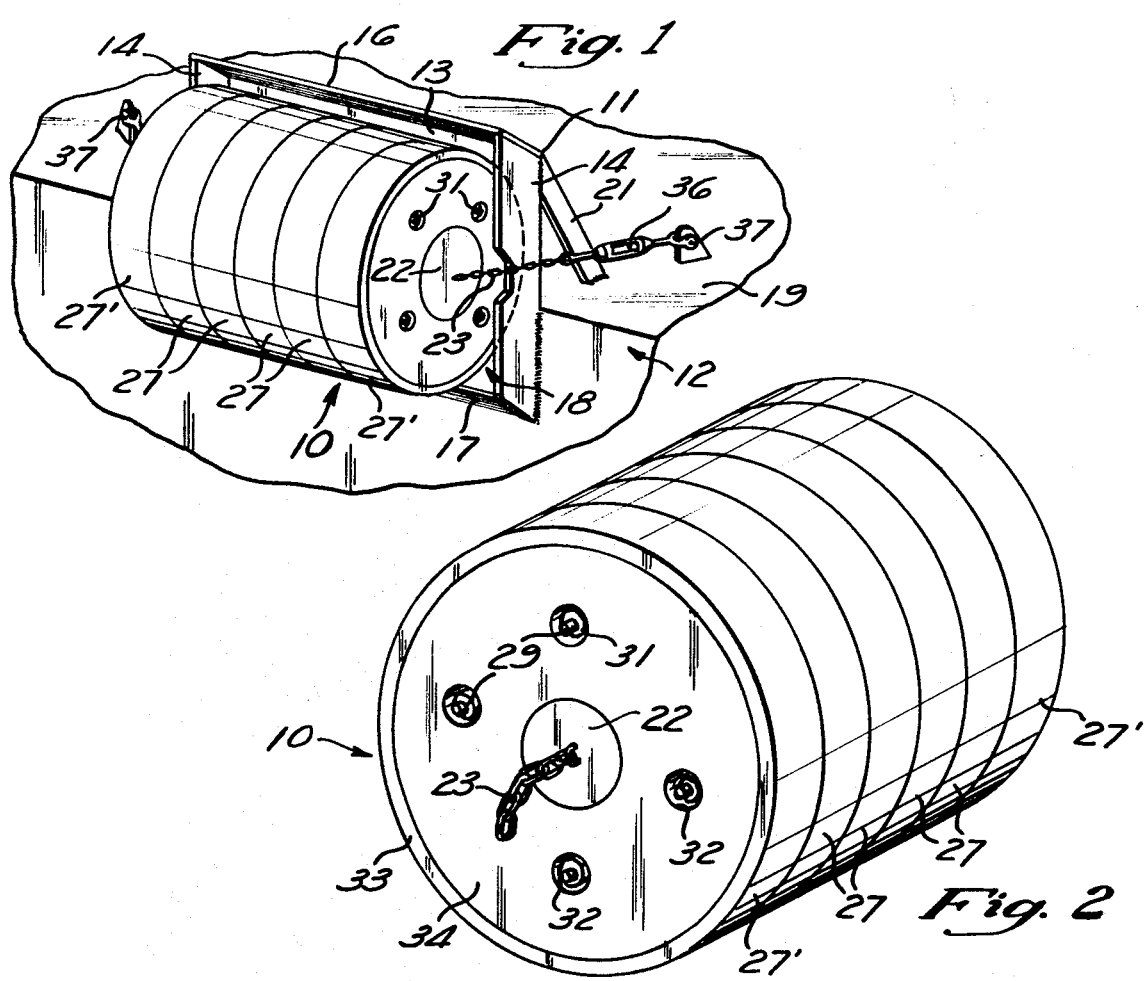
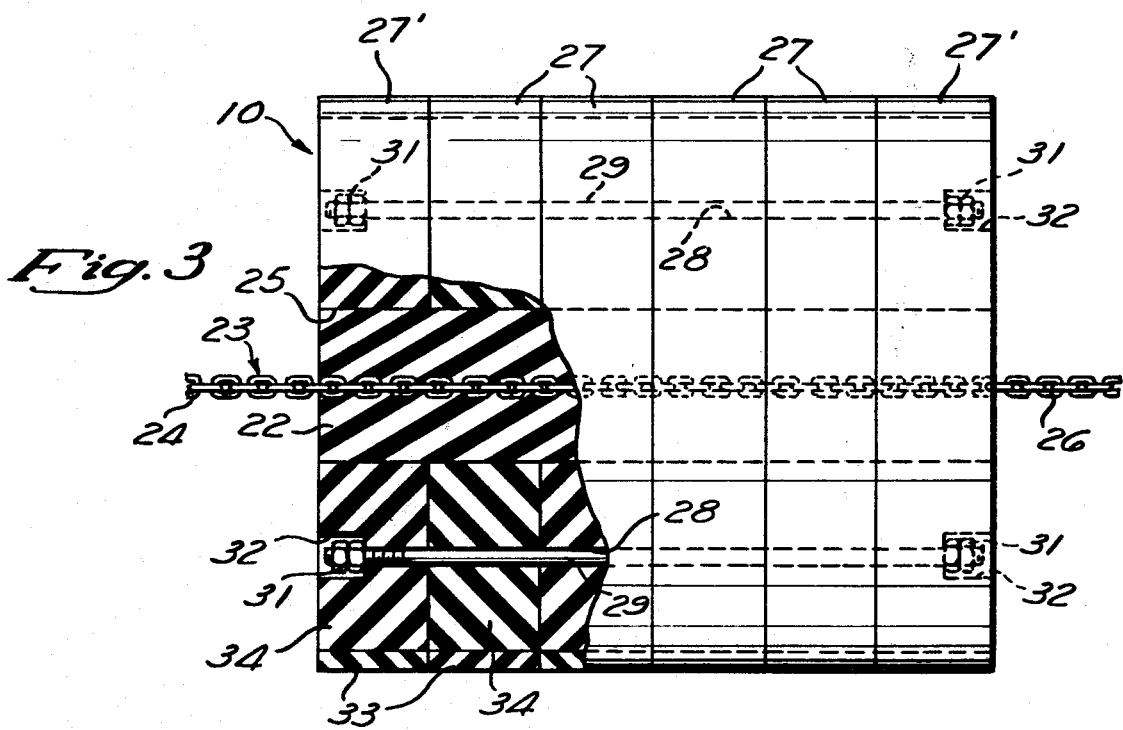

HEAVY DUTY FENDER

BACKGROUND OF THE INVENTION

This invention relates generally to fenders or the like and more particularly to a novel and improved fender structure suitable for use in cushioning very large loads which can ooccur for example in marine installations.

PRIOR ART

Fenders are extensively used to prevent damage caused by contact between two relatively movable bodies. Such fendering devices are often formed of elastomeric material which is mounted on docks or ships to cushion impacts or to cushion loads which are transmitted between, for example, tugs or push boats and other vessels.

When a fender is used in a system having very large masses, the fendering devices must be capable of absorbing very large loads. For example, large tugs are often used to maneuver large ships and it is inevitable that contact occur between the two which can cause substantial damage unless very high capacity fendering devices are provided.

It is known to produce fendering devices by extruding elastomeric material to produce elongated fenders. An example of such a fendering device is described in the U. S. Letters Pat. to Sudyk No. 3,447,794 issued June 3, 1969. Such patent is assigned to the assignee of the present invention. The fendering devices of such patents include a centrally located chain which extends along the length of the extruded elastomeric body and provides free end portions for mounting or securing the fender in position.

It is also known in the construction of large fenders to assemble a stack of relatively thin elastomeric wafers and to lash them together with cables to form a generally cylindrical fenders structure. Such fenders are often assembled on a central rod which is connected at its ends to mounting devices for the fender.

Such wafer type fenders have several disadvantages. Because the wafers are relatively thin compared to their diameter they tend to fold and bend over under load instead of radially compressing. Consequently, the loads which can be absorbed by such fendering devices are limited. Also, such fendering devices tend to crush and deteriorate in use. Further, they tend to leave dark marks on the vessels against which they work.

SUMMARY OF THE INVENTION

A fender in accordance with the present invention includes a core and a plurality of discs structured to provide high load cushioning capacity, long wear characteristics, reduced tendency to leave marks and low manufacturing costs.

A fender in accordance with the illustrated embodiments of the present invention consists of a central core of extruded elastomeric material having a chain embedded therein along its length. Such chain extends beyond the ends of the core and provides means to mount or anchor the fender. Positioned around the core is a stack of molded discs formed of elastomeric material. Such discs have sufficient thickness when compared to their diameter to strongly resist any tendency to fold over, particularly, in the assembled fender. Because a plurality of discs are stacked or assembled on the core, the fender of substantially any length can be produced without requiring excessively large molds. Such discs are connected together by a plurality of bolt-like fasteners which extend through the discs so that they cooperate with each other to properly absorb loads.

In order to minimize the marking effect of the fenders such discs are provided with an outer surface layer formed of a gray elastomeric material which is colored and selected to provide a minimum tendency for marking and to provide good wear properties. The remainder or inner portion of the discs are formed of standard black rubber type elastomeric material having a durometer selected to provide the desired cushioning characteristics. Such inner portions are, in some embodiments, molded with openings to increase the radial compressability of the fender so as to provide substantially any desired compressability characteristic. Further, the use of holes or openings within the inner disc material reduces the amount of material required and thereby reduces the manufacturing costs.

With the illustrated structure the central core can be extruded with moderately sized extruder and the disc can be molded in moderately sized molds on moderately sized presses while still permitting the manufacture of large fenders capable of withstanding substantially any required load. Because the discs provide substantial resistance to bending or folding-like action when they are loaded, a fender of a given size is capable of withstanding far greater loads than the wafer type fender discussed above and is more durable in use.

BRIEF DESCRIPTION OF THE DRAWINGS

FIG. 1 is a perspective view illustrating a typical installation of a fender in accordance with the present invention on a vessel;

FIG. 2 is an enlarged perspective view of the fender illustrating before mounting;

FIG. 3 is a side elevation partially in longitudinal section illustrating the structure of an assembled fender in accordance with the present invention;

DETAILED DESCRIPTION OF THE DRAWINGS

Figure 4:
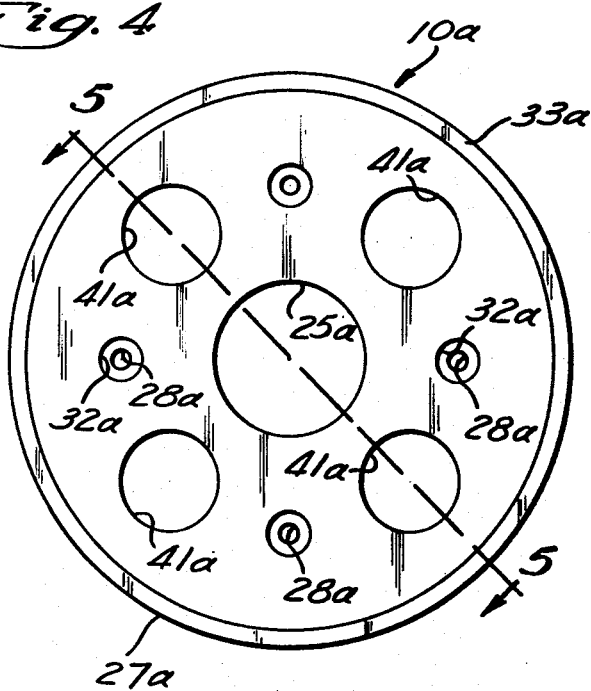
FIG. 4 is an end elevation of a single disc in accordance with a second embodiment of this invention in which a plurality of symmetrically arranged circular openings are molded into the disc to increase its ability to radially deform under a given loading condition.

FIG. 1 illustrates one preferred embodiment of the present invention showing the fender mounted in a typical ship board installation. The fender designated generally at 10 is positioned within a fender mounting assembly 11 supported on the hull 12 of a ship. The fender mounting assembly 11 includes a back plate 13 welded to the hull 12 and providing end plates 14, a top plate 16 and a bottom plate 17 which cooperate to define a pocket 18 which receives the rearward side of the fender 10. In the illustrated mounting assembly 11 the assembly extends above a deck 19 so braces 21 are provided to support the upper edge of the back plate 13.

The fender 10 includes a cylindrical core 22 which is preferably formed by extrusion of elastomeric or other rubber-like material. Embedded within the core 22 is a link chain 23 which extends along the central axis of the core throughout its length and provides free end portions 24 and 26 extending beyond the ends of the core 22. The core 22 with the chain 23 embedded therein is preferably formed in accordance with the disclosure of the Sudyk patents supra and the disclosure of such patent is incorporated herein by reference.

Positioned around the core 22 are a plurality of elastomeric discs 27 which are annular in shape and provide a central opening 25 proportioned to receive the core 22 with a close fit. The discs 27 are similar in dimension and have a plurality of symmetrically arranged openings 28 formed therein which are aligned and receive a plurality of rod type fasteners 29. The end two discs 27' are formed with counter-bores 32 at the end of their openings 28 to receive nut fasteners 31 threaded on to the ends of the rods 29. In the illustrated embodiment two nuts 31 are provided at each end of each rod for locking purposes and are recessed along with the ends of the rod within the counter-bores 32 so that the rods do not project beyond the ends of the fender. Excepting for the recesses 32 formed in the end discs 27', all of the discs 27 are similar in structure.

Each disc is provided with an outer layer 33 formed of elastomeric material having properties different than the properties of the elastomeric material forming the inner or remaining portions 34 of each disc. Preferably, the material forming the outer layer 33 is gray rubber to minimize marking of a surface when such surface engages the fender. Also the outer layer 33 is selected to provide high wear characteristics. Such outer layer 33 may be, for example, an Ethylene, Propylene and Terpolymer having a durometer in the order of 60 to 80 on the Shore A scale. The inner portion 34 of each disc on the other hand is preferably formed of standard black rubber or the like which would tend to produce marking on an engaged surface if it were not protected by the outer layer 33. Such inner rubber can again be Ethylene, Propylene and Tcrproplymer having a durometer in the order of 50 to 80 on the Shore A scale.

The durometer of the inner portion 34 of each disc is selected to provide the elastomeric deformation qualities required for the desired cushioning properties of the fender.

The ends 24 and 26 may be secured to the vessel through turnbuckles 36 or the like which are anchored at 37 and provide adjustment of the tensioning of the mounting of the fender. It is desirable that the mounting of the fender 10 be provided by a flexible tension system which can provide give when the fender is engaged by a loading surface of another vessel or a dock or the like. The chain 23 is embedded in the core 22 in such a manner that the links of the chain are extended and are embedded within the material of the core to prevent relative movement between the links of the chain and the material forming the core as described in the Sudyk patent sypra. Therefore, there is substantially no tendency for the chain to work with respect to the core material so the tendency for the chain to cut through the core material during use is virtually eliminated. It should be understood, however, that other forms of mounting means such as cables, ropes, and rods or the like may be used in accordance with the broader aspects of this invention.

In the illustrated embodiment the fender 10 is cylindrical and has a diameter of 30 inches and a length of 36 inches. The core is cylindrical having a diameter of 8 inches. The thickness of each of the discs is 6 inches. In such embodiment the outer layer 33 is one inch thick and is bonded to the inner portions 34. The ratio of the lateral width to radial thickness of the discs are preferably selected so the width is at least ⅓ of the radial thickness to provide substantial resistance to disc bending. Such minimum ratio insures that radial deformation accounts for a substantial part of the cushioning action. Four rod fasteners 29 clamp the six discs together. In the illustrated embodiments the discs are not bonded to the core 22 but are merely assembled on the core as illustrated. In such embodiment the end plates 14 of the mounting assembly insure that the disc assembly does not move longitudinally with respect to the core to any substantial extent and the location of the core is maintained by the chain mounting. In other instances where axial location of the disc with respect to the core is required, the discs 6 are bonded to the core or otherwise suitably secured to the core against axial displacement.

With such structure a fender can be easily manufactured without requiring excessively large equipment. For example, the core 22 is extruded in substantially any length required and each of the discs is separately molded in a moderately sized mold on a moderately sized press. When greater fender length is required, it is merely necessary to provide a core of the appropriate length and to assemble a greater number of discs along the core. Because the thickness of the discs with respect to their diameter is substantial, each disc tends to resist a bending type deformation and in the assembly cooperate to provide substantial resistance to bending so that the discs provide radial type deformation during the cushioning operation of the fender.

Figure 5:
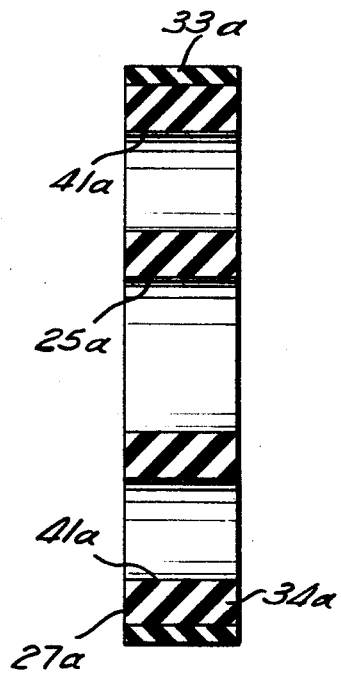
FIG. 5 is a cross section taken generally along 5—5 of FIG. 4.

FIGS. 4 and 5 illustrate a disc structure in accordance with another embodiment of this invention. In this embodiment similar reference numerals are used but a subscript (a) is added to indicate reference to the second embodiment of FIGS. 4 and 5. Here, again, each disc is formed with an outer layer 33a and a central opening 25a proportioned to closely fit a core as illustrated in FIG. 3. Each disc is also formed with openings 28a to receive rod fasteners and end discs have counter-bores at 32a to receive the fasteners at the ends of the rods.

In this embodiment, however, each disc is formed with a plurality of symmetrically positioned through openings 41a which in this instance are circular in shape. These openings 41a function to increase the radial deformation capacity of the disc and in turn of the assembled fender. The size, shape and location of the openings can be selected to provide substantially any desired cushioning characteristics in the assembled fender and are combined with various rubber durometers to produce a selected or desired cushioning characteristic. In addition, the presence of the openings 41a reduces the material requirement for the manufacture of a given size fender and thereby reduces the manufacturing costs of the fender.

Figure 6:
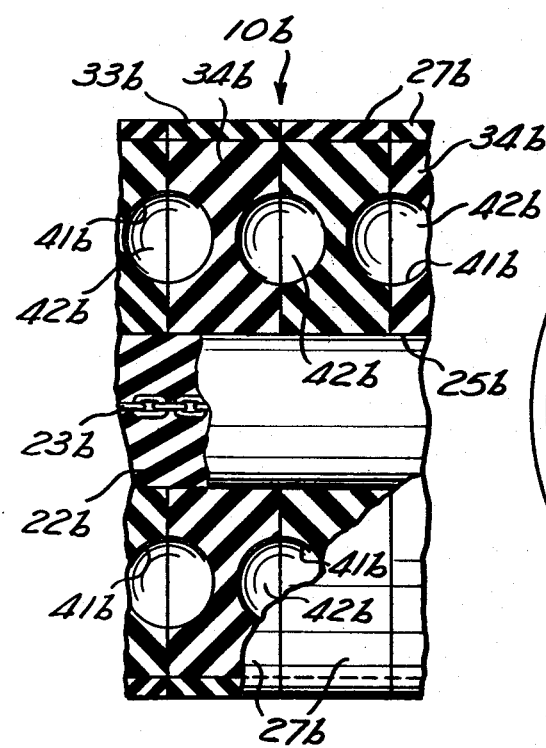
FIG. 6 is a side elevation partially in longitudinal section illustrating still another embodiment of the present invention in which enclosed openings are provided in the assembled fender to modify the compressive characteristics of the disc when subjected to loading conditions.

FIG. 6 illustrates a disc formed in accordance with the third embodiment of the present invention. In this instance a subscript (b) is used to indicate reference to the third embodiment while the reference numerals designate similar parts. In the embodiment of FIG. 6 each disc 27b is formed with a plurality of symmetrically arranged hemispherical openings 41b which cooperate when the discs are assembled to provide spherical recesses 42b within the structure of the fender 10b. Here, again the size and location of the recesses are selected to provide, in cooperation with the selected durometer of the inner portion 34b, the desired cushioning characteristics.

Figure 7:
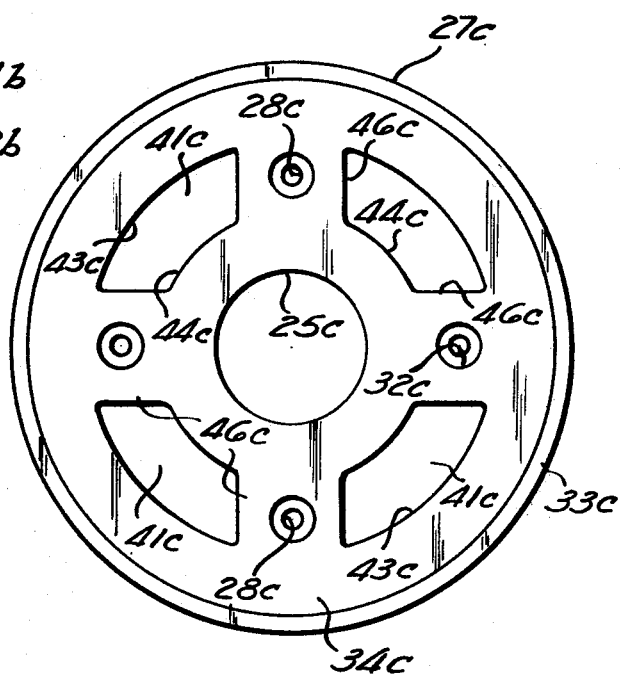
FIG. 7 is a side elevation of a disc providing openings shaped as truncated sectors.

FIG. 7 illustrates still another embodiment wherein the discs 27c are formed with openings 41c having a truncated sector shape as illustrated in the drawings. Such openings have an outer surface provided by a segment of a cylinder 43c and an inner surface formed by a smaller diameter cylinder segment 44c where the two segments are joined by generally radially extending side walls 46c.

It should also be understood that even though the illustrated embodiments of the invention all provide cylindrical fenders that the disc and the core can be formed with other shapes.

Although preferred embodiments of this invention are illustrated it is to be understood that various modifications and rearrangements may be resorted to without departing from the scope of the invention disclosed and claimed.

I claim:

1. A heavy duty fender structure comprising an elongated core formed of substantially solid elastomeric material, elongated mounting means anchored to said core and providing portions extending from each end of said core for mounting said fender, a plurality of separate and abutting elastomeric annular disc members assembled around said core and cooperating to provide an exterior fender surface along the length of said core operable to resiliently deform under loads and provide a cushioning action, each of said disc members providing an individual outer layer of relatively hard elastomeric material selected for its properties of wear resistance and an individual inner portion formed of elastomeric material selected for its deformation characteristics, said elastomeric materials forming said inner portion being softer than the elastomeric material forming said outer layer, said individual outer layer of each of said disc members cooperating with the individual outer layers of the other disc members to provide said exterior fender surface, the separate structure of said disc members enabling the outer layer and inner portion of each disc member to deflect radially substantially independently of the outer layers and inner portions of the other disc members when subjected to a radial load, and elongated connectors extending through said disc members to maintain them in laterally abutting relationship.

2. A heavy duty fender structure set forth in claim 1 wherein the end disc members of said fender are formed with recesses to receive the ends of said connectors and the ends of said connectors do not project beyond the ends of said fender.

3. A heavy duty fender structure as set forth in claim 1 wherein said discs have a width at least one third as great as their radial thickness.

4. A heavy duty fender structure as set forth in claim 3 wherein said inner portions of said disc are formed with openings therein which increase the deformability of said fender.

5. A heavy duty fender structure as set forth in claim 4 wherein said openings are symmetrically arranged truncated sectors.

6. A heavy duty fender structure as set forth in claim 4 wherein said openings are circular.

7. A heavy duty fender structure as set forth in claim 4 wherein said openings are formed by recesses.

8. A heavy duty fender structure as set forth in claim 7 wherein said openings are generally hemispherical in shape and cooperate with adjacent openings of adjacent discs to form generally spherical openings within said fender.

9. A heavy duty fender structure comprising an elongated core of elastomeric material, mounting means in said core and providing mounting portions at each end of said core for mounting said fender, a plurality of separate elastomeric annular discs assembled around said core, and means fastening said discs together, said discs having a substantial resistance to bending whereby substantial portions of the cushioning action of said fender result from radial deflection of the material forming said discs and core, each disc providing an individual outer layer of elastomeric material selected for its properties of non-marking and wear resistance and an individual inner portion formed of elastomeric material of different properties from that of its outer layer and selected for its deformation characteristics, the separate structure of said discs enabling the outer layer and inner portion of each disc to deflect radially substantially independently of the outer layers and inner portions of the other discs when subjected to a radial load.

10. A heavy duty fender structure as set forth in claim 9 wherein said inner portions of said disc are formed with openings therein which increase the deformability of said fender.

11. A heavy duty fender structure as set forth in claim 9 wherein said core is extruded, and said discs are molded.

12. A heavy duty fender structure comprising an elongated core of elastomeric material, a chain embedded in said core along its length and providing end portions free of said core for mounting said fender, a plurality of separate laterally abutting elastomeric annular discs mounted on said core each providing an exterior surface cooperating with the exterior surfaces of the other discs to provide an outer fender surface, loads applied to said outer fender surface producing substantial cushioning of said loads by radial deflection of said discs, each disc providing an individual outer layer of elastomeric material selected for its properties of non-marking and wear resistance and an individual inner portion formed of elastomeric material of properties different from the outer layer and selected for its deformation characteristics, the separate structure of said discs enabling the outer layer and inner portion of each disc to deflect radially substantially independently of the outer layers and inner portions of the other discs when subjected to a radial load.

13. A heavy duty fender structure as set forth in claim 12 wherein said core is extruded and said discs are molded.

14. A heavy duty fender structure as set forth in claim 13 wherein said core is cylindrical and said discs are circular in cross section and have a circular central opening.

15. A heavy duty fender structure comprising an elongated core of elastomeric material, mounting means in said core and providing mounting portions at each end of said core for mounting said fender, a plurality of individual elastomeric annular discs separably assembled coaxially around said core whereby said discs are at least partially radially supported by said core, said discs collectively forming an exterior fender surface, and means separate from said core axially retaining said discs together on said core, said discs being axially unrestricted by said core and being relatively free of axial restraint by said retaining means and said mounting portions at said core, said discs having substantial resistance to bending when a radial load is applied thereto at said exterior fender surface whereby substantial portions of the cushioning action of said fender result from radial deflection of the material forming said discs and core.

* * * * *